C. C. ZIMMERMAN.
RAIL SAW.
APPLICATION FILED FEB. 19, 1919.
1,348,616.
Patented Aug. 3, 1920.
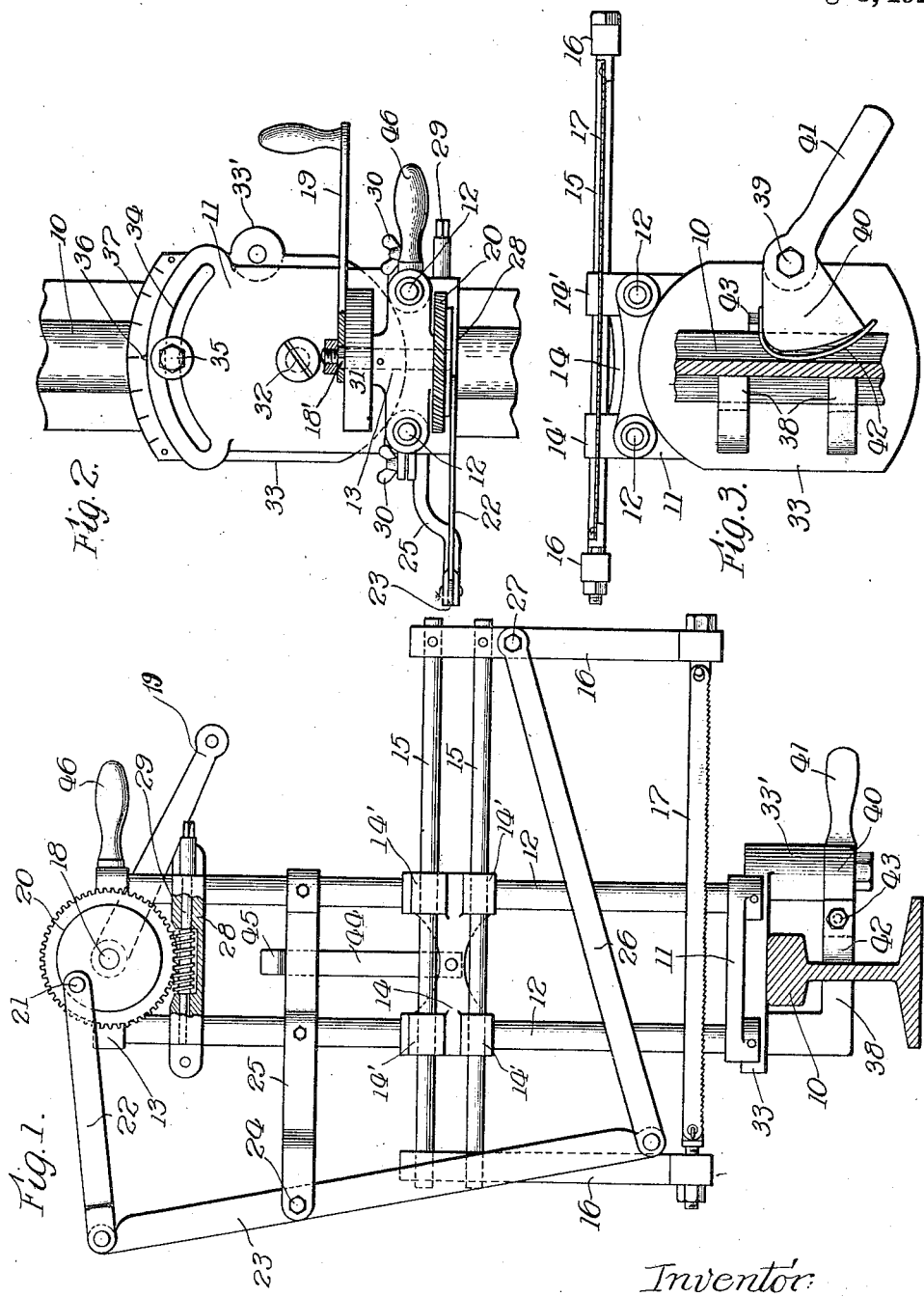
Witness:
G. J. Sauser.
Inventor:
Clarence C. Zimmerman,
By Pond & Wilson
Attys.

UNITED STATES PATENT OFFICE.

CLARENCE C. ZIMMERMAN, OF CHICAGO, ILLINOIS, ASSIGNOR TO NATIONAL SURFACE GUARD COMPANY, OF CHICAGO, ILLINOIS, A CORPORATION OF ILLINOIS.

RAIL-SAW.

1,348,616.  Specification of Letters Patent.  Patented Aug. 3, 1920.

Application filed February 19, 1919. Serial No. 277,981.

*To all whom it may concern:*

Be it known that I, CLARENCE C. ZIMMERMAN, a citizen of the United States, residing at Chicago, in the county of Cook and State of Illinois, have invented certain new and useful Improvements in Rail-Saws, of which the following is a specification.

This invention relates to tools for cutting structural iron and steel bars and rails into suitable lengths, and in the embodiment of the invention herein shown and described is more particularly designed and adapted for cutting the rails of railway tracks, especially those that have been already laid.

The implement forming the subject matter of my present invention is in the nature of an improvement upon the rail saw disclosed and claimed in Letters Patent No. 1,294,593, granted to me on the 18th day of February, 1919; and among the principal objects of the present invention are, first, to simplify my former construction and reduce the number of parts; second, to provide a construction adapted to be operated either by power or by hand as circumstances or choice may determine, and, third, to provide an improved means for securely clamping the saw on the rail to be cut, rendering it more adaptable to varying sizes and weights of rails.

These and other objects and advantages of the invention will be apparent to those skilled in the art from the following detailed description, taken in connection with the accompanying drawing wherein I have illustrated one practical and workable embodiment of the invention, and wherein—

Figure 1 is a front elevation of the complete saw shown as mounted in working position upon a railroad rail.

Fig. 2 is a top plan view of the same.

Fig. 3 is a bottom plan view, in horizontal section through the web of the rail.

Referring to the drawing, 10 designates a rail of a railway track, on which my improved saw is adapted to be mounted for the purpose of cutting the same. The frame of the implement comprises a horizontal bottom member 11, a pair of spaced vertical uprights 12 rigidly mounted at the lower ends in the bottom member 11, and a cross-connecting member 13, preferably a suitable casting, which rigidly unites the upper ends of the uprights 12. Slidably mounted on the uprights 12 is a saw carriage 14 that is formed with horizontal bearings or slideways 14' for the upper member of a saw frame consisting, in this instance, of a pair of parallel rods 15, to the ends of which are secured the end frame members 16 between the lower ends of which latter is mounted the saw blade 17. The cross-connecting member 13 is formed witht a central transverse bearing for a driving shaft 18, which latter is formed square at one end as shown at 18' (Fig. 2) for the application of a hand crank 19 when the saw is to be operated manually. Fast on the other end of the driving shaft is a crank disk 20, the periphery of which is toothed in the manner of a worm wheel. On the outer face of the disk 20 is a wrist pin 21 on which is pivoted a link 22, the opposite end of which latter is pivoted to the upper end of a lever 23. The latter is pivoted between its ends at 24 to one end of a fulcrum bar 25 that is rigidly secured to the uprights 12 of the frame above the carriage 14. To the lower end of the lever 23 is pivoted one end of a link 26, the opposite end of which is pivoted at 27 to one of the end frame members 16 of the saw.

Slidably mounted on the uprights 12 is a bearing member 28 in which is journaled a worm shaft 29, the worm of which is movable into and out of driving relation to the worm wheel 20 by a simple up and down adjustment of the bearing member 28 on the uprights 12, said bearing member being mounted on said uprights by split bearings that may be clamped and released by wing-bolts 30 (Fig. 2).

Fast on the driving shaft, on the opposite side of its bearing from the worm gear 20, is a pulley 31.

From the foregoing it will be seen that the saw herein shown and described, is capable of being operated either manually by means of the hand crank 19 when no power is available, or by belt drive to the pulley 31, or by an electric or air drive through the worm shaft 29 and worm wheel 20, as circumstances or choice may determine.

As in the machine of my former patent above referred to, the present machine is adapted to cut the rail either at right angles or obliquely, for which purpose the bottom frame member 11 is pivoted at 32 on a base plate 33 that rests directly on the top or head of the rail. The bottom frame member 11 is formed with an arcuate slot 34 through which passes a clamping screw 35 threaded into the base plate 33. To measure the angle, the frame member 11 carries a pointer 36 that coöperates with a degree scale 37 marked on one edge of the base plate 33.

In the machine of my former patent the element corresponding with the base plate 33 is provided with means for clamping it to the head of the rail. I have found by experiment that it is better practice to clamp this member to the web of the rail. Not only does the latter secure greater rigidity, but it adapts the implement for use on a greater variety of sizes and weights of rails, since there is less variation in the thickness of the web in the different sizes and weights of rails than in the width of the head. To this end, therefore, I provide on the underside of the base plate 33 one or more downwardly and inwardly extending lugs 38, two being shown in the present instance, which bear against one side of the web of the rail. Journaled in a suitable bearing 33' on the other side of the base plate 33 is the stem or shaft 39 of a horizontally swinging cam 40, that is provided with an actuating handle 41. The working face of this cam is designed to effect a powerful clamping action on the opposite side of the web of the rail; and I have discovered that the holding effect of the cam under the jars and vibrations of the saw frame is greatly improved by applying to the working face of the cam a transversely elastic contact strip 42, clearly shown in Fig. 3, this strip being secured to the cam at one end by a screw 43 and normally lying slightly bowed away from the face of the cam. The other end of the contact strip is free, so that when the cam is swung to clamping position the contact strip is flattened against the face of the cam against its own resiliency, and thereby effects a powerful friction grip on the web.

In order to support the saw from the frame in an elevated position above the work, I provide a vertical strap bar 44 that is bolted at its lower end to the saw carriage 14 and terminates at its upper end in a forwardly facing hook 45 that, in the raised position of the saw carriage, engages over the upper edge of the fulcrum bar 25, as clearly shown in Fig. 1.

To the upper cross-connecting frame member 13 is secured a handle 46, by grasping which in one hand while the handle 41 is grasped in the other, the complete device may be readily transported and set in place by a single operator.

It is believed that the construction, manner of use and advantages of this invention will be readily understood and appreciated from the foregoing without further detailed description. Manifestly the structure may be modified in respect to details without altering its substantial character or sacrificing the advantages inherent therein; hence I reserve all such variations and modifications as fall within the spirit and purview of the invention as defined in the appended claims.

I claim:

1. In a rail saw, the combination with a frame comprising a base member, two parallel uprights rising from said base member, and a cross-connecting member rigidly uniting the upper ends of said uprights, of a carriage mounted to slide on said uprights, a saw reciprocably mounted on said carriage, a driving shaft journaled in the cross-connecting member of said frame, and power-transmitting connections between said driving-shaft and said saw.

2. In a rail saw, the combination with a frame comprising a base member, two spaced vertical uprights rising from said base member, and a cross-connecting member rigidly uniting the upper ends of said uprights, of a carriage mounted to slide on said uprights, a saw reciprocably mounted on said carriage, a driving shaft journaled in the cross-connecting member of said frame, a crank member on said driving shaft, a fulcrum bar rigidly mounted on said frame uprights above said carriage, a lever pivoted intermediate its ends on said fulcrum bar, a link connecting the upper end of said lever to said crank member, and a link connecting the lower end of said lever to said saw.

3. In a rail saw, the combination of a frame, a saw carriage slidably mounted on said frame, a saw reciprocably mounted on said carriage, a driving shaft journaled in said frame, power-transmitting connections between said driving shaft and said saw, a driven gear member fast on said driving shaft, and a driving gear member adjustably mounted on said frame and movable into and out of mesh with said driven gear member.

4. In a rail saw, the combination of a frame including a pair of spaced vertical uprights, a saw carriage slidably mounted on said uprights, a saw reciprocably mounted on said carriage, a driving shaft journaled in said frame, power-transmitting connections between said driving shaft and said saw, a worm-gear fast on said driving shaft, a worm-shaft bearing member mounted on said uprights and adjustable toward and from said worm-gear, and a worm-shaft journaled in said bearing member.

5. In a rail saw, the combination of a frame, a saw carriage slidably mounted on said frame, a saw reciprocably mounted on said carriage, a driving shaft journaled in said frame, power-transmitting connections between said driving shaft and said saw, a driven gear member fast on said driving shaft, a driving gear member adjustably mounted on said frame and movable into and out of mesh with said driven gear member, and a pulley fast on said driving shaft.

6. In a rail saw, the combination with a frame carrying a saw and operating mechanism therefor, of a supporting base for said frame adapted to rest on the head of the rail, said base having on its under side one or more lugs adapted to bear against one side of the web of the rail, a cam rotatably mounted on the under side of said base, a transversely elastic contact strip secured to the working face of said cam and adapted to bear against the opposite side of the web of the rail, and a handle on said cam.

CLARENCE C. ZIMMERMAN.